United States Patent Office 3,448,831
Patented June 10, 1969

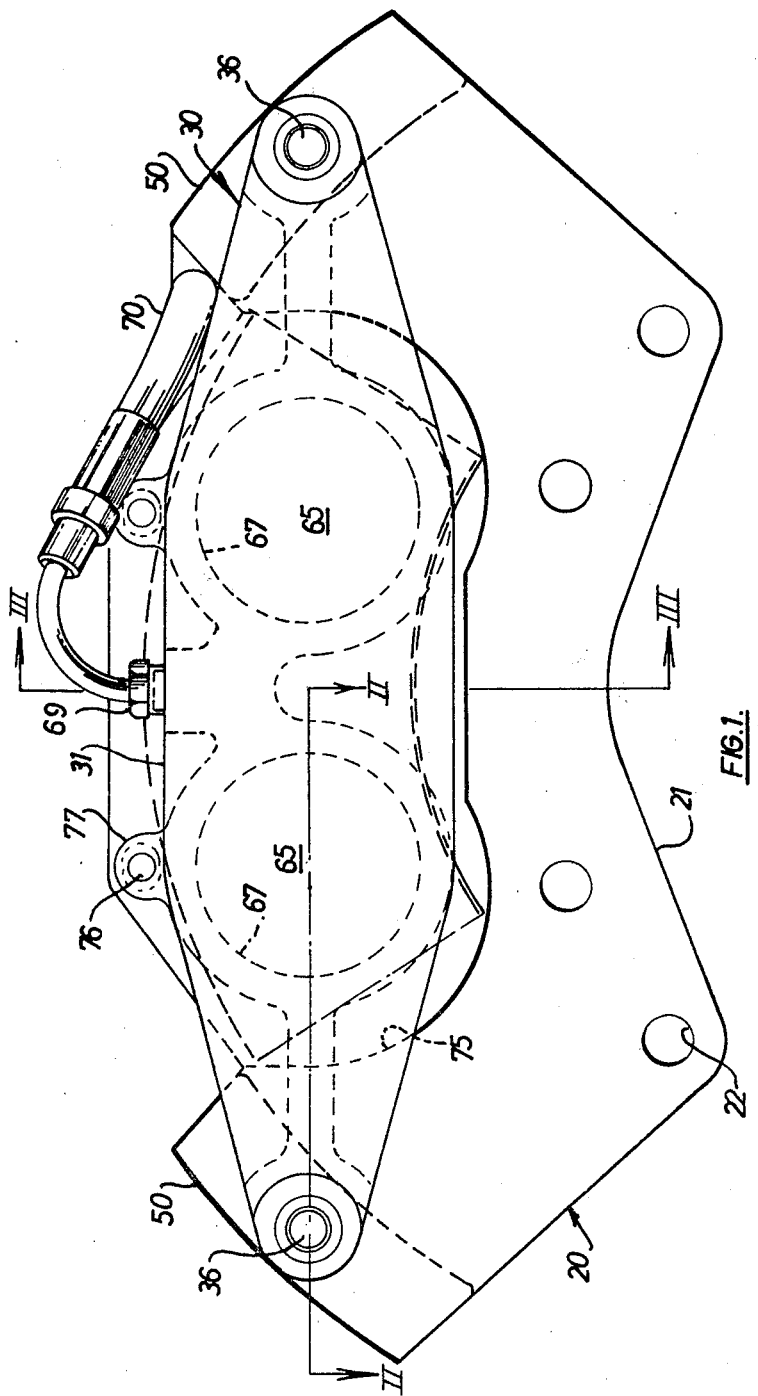

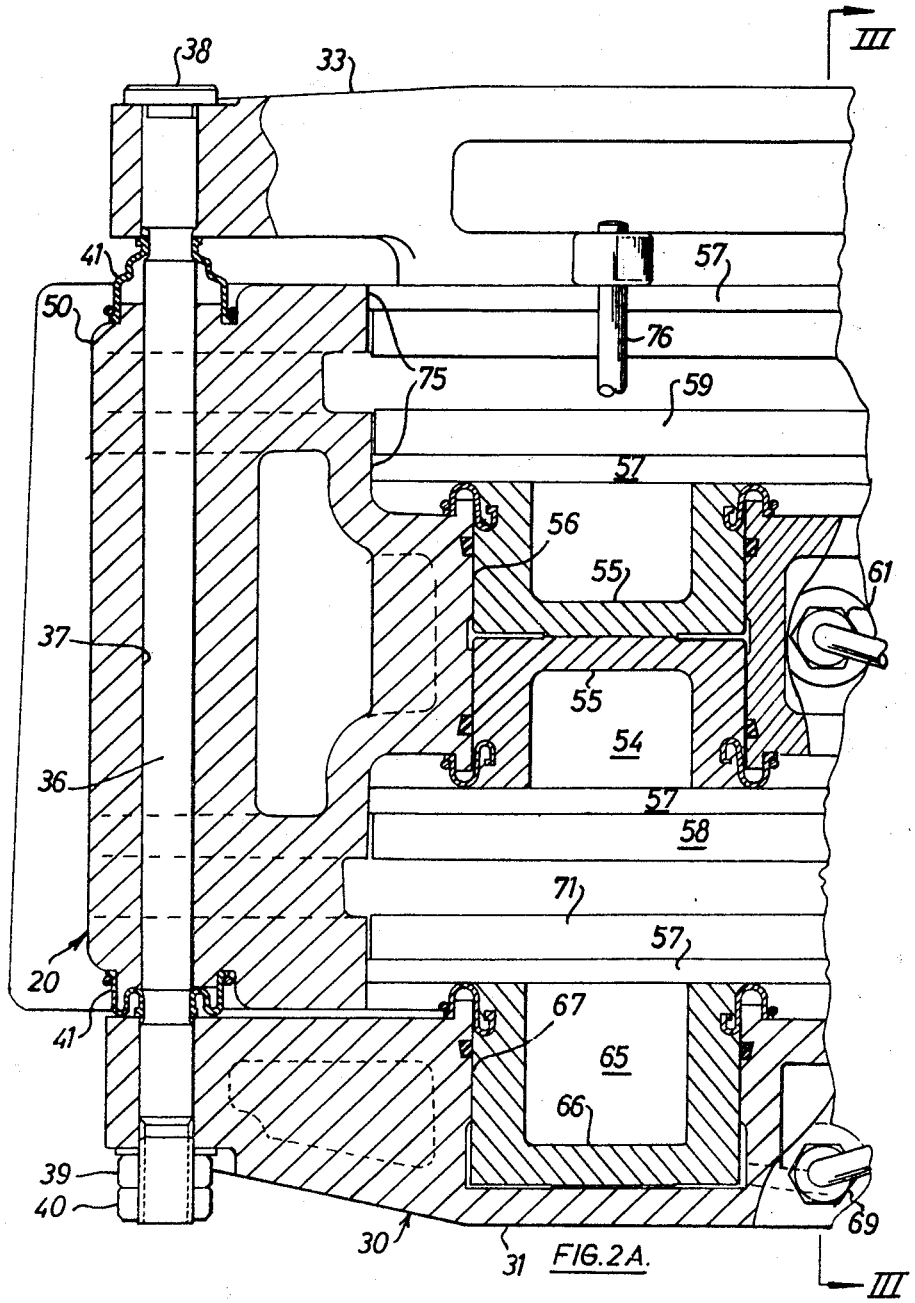

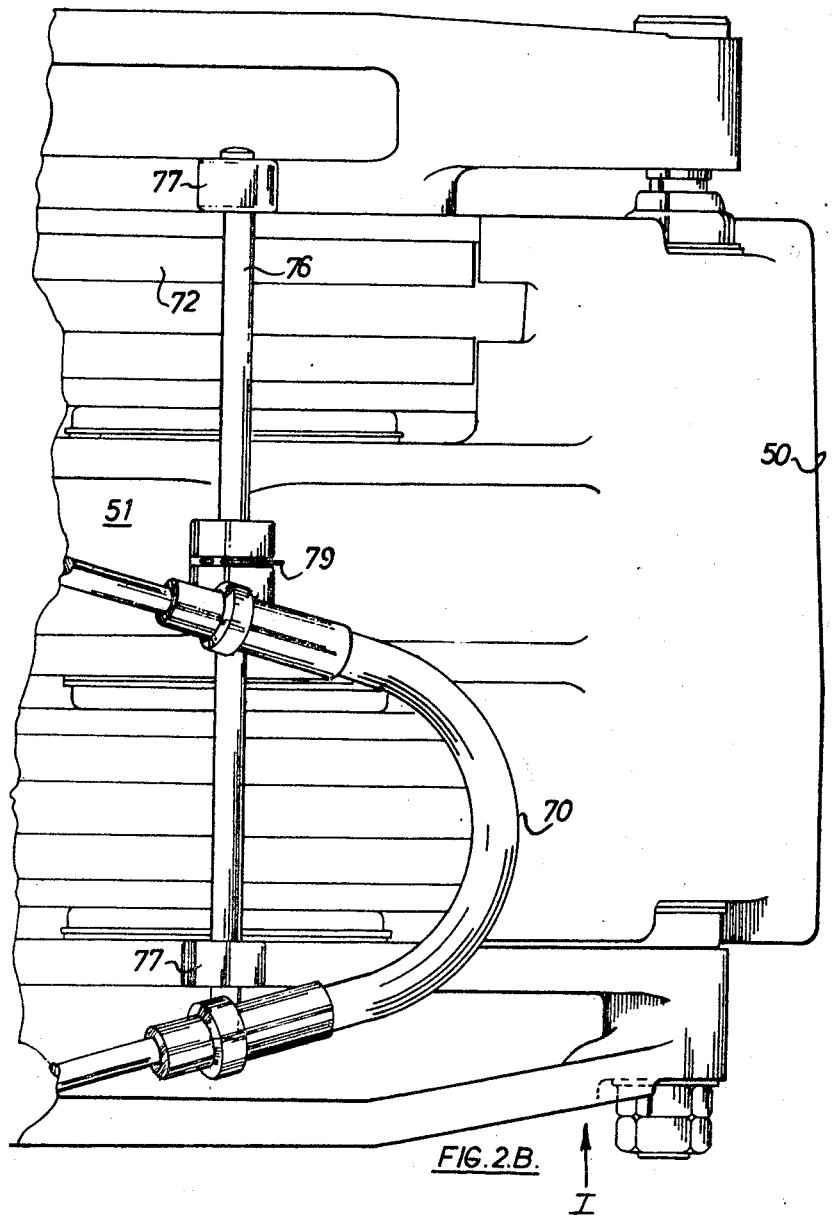

3,448,831
SPREADING, SPOT-TYPE DISC BRAKE
Charles Newstead, Walsall, England, assignor to Girling Limited, Tyseley, Birmingham, Warwickshire, England
Filed Sept. 5, 1967, Ser. No. 665,522
Claims priority, application Great Britain, Sept. 22, 1966, 42,270/66
Int. Cl. F16d 55/00
U.S. Cl. 188—73                 13 Claims

ABSTRACT OF THE DISCLOSURE

The invention provides a multi-disc brake having preferably two axially spaced discs. A first hydraulic actuator in a fixed body member acts upon inner brake pads cooperating with opposed inward faces of the discs. A yoke or caliper is slidably guided by the body member and acts upon an outer pad cooperating with the outward face of one disc. A second hydraulic actuator acts between the yoke and another outer pad cooperating with the outward face of the other disc. All the brake pads are preferably located by the body member so that the latter receives the drag directly especially from the outer pads. The first actuator may comprise a pair of opposed pistons slidable in a through bore in a medial web portion of the body member or a piston slidable in a blind bore in a cylinder block which is axially slidably guided in the body member.

---

The present invention relates to a multi-disc brake, i.e. a brake having a plurality of spaced apart discs and brake pads co-operable with both faces of each disc.

A previously proposed twin-disc brake has a first hydraulic actuator supported on a fixed body member and acting between the two brake pads engaging the opposed inward faces of the discs and second and third hydraulic actuators acting separately on the two outer pads engaging the outer faces of the discs, the actuators being operable simultaneously.

An object of the present invention is to avoid the necessity for one of the actuators, and so permit a reduction in the axial dimensions and weight of the brake and the number of oil seals whereby to decrease the cost of its manufacture and to improve its reliability.

According to the present invention, a multi-disc brake comprises a body member adapted to be fixed adjacent a plurality of axially spaced brake discs, first actuator means supported on the body member and having oppositely movable parts which act on adjoining inner brake pads cooperating with opposed inward faces of the discs, a yoke slidably mounted on the body member to act upon an indirectly operated pad cooperating with the outward face of one of the discs, and second actuator means acting between the yoke and a directly operated pad cooperating with the outward face of another disc, said first and second actuator means being operable simultaneously.

Preferably the actuator means comprise hydraulic actuators whose cylinders are permanently interconnected.

The elimination of the hydraulic cylinder for the direct operation of the outboard pad, which is normally positioned within the vehicle wheel out of the air stream, obviates the risk of boiling the brake fluid at this locality.

Conveniently the yoke comprises a pair of beams running across said outward faces of the discs and interconnected by tie rods slidably passing through holes in the body member. One beam may directly engage the back plate of the indirectly operated outer pad whilst the other beam has formed therein a cylinder of the actuator for the directly operated outer pad.

In one embodiment as applied to a twin-disc brake, the first actuator means comprise a pair of opposed pistons slidable in a cylinder formed in a limb of the body member extending between the discs. In another embodiment also as applied to a twin-disc brake, the first actuator means comprise a cylinder block slidably mounted on the body member and engaging the back plate of one of the inner pads and a piston slidably mounted in a blind bore of the cylinder block and engaging the back plate of the other inner pad.

The invention is further described, by way of example, with reference to the accompanying drawings, in which:

FIG. 1 is a side elevation, viewed in the direction of the arrow I in FIGS. 2B and 3, of a first embodiment of twin-disc brake constructed in accordance with the invention;

FIG. 2A is a plan view, partly sectioned on the line II—II of FIG. 1;

FIGURE 2B is a partial plan view of FIGURE 1;

Figure 3:
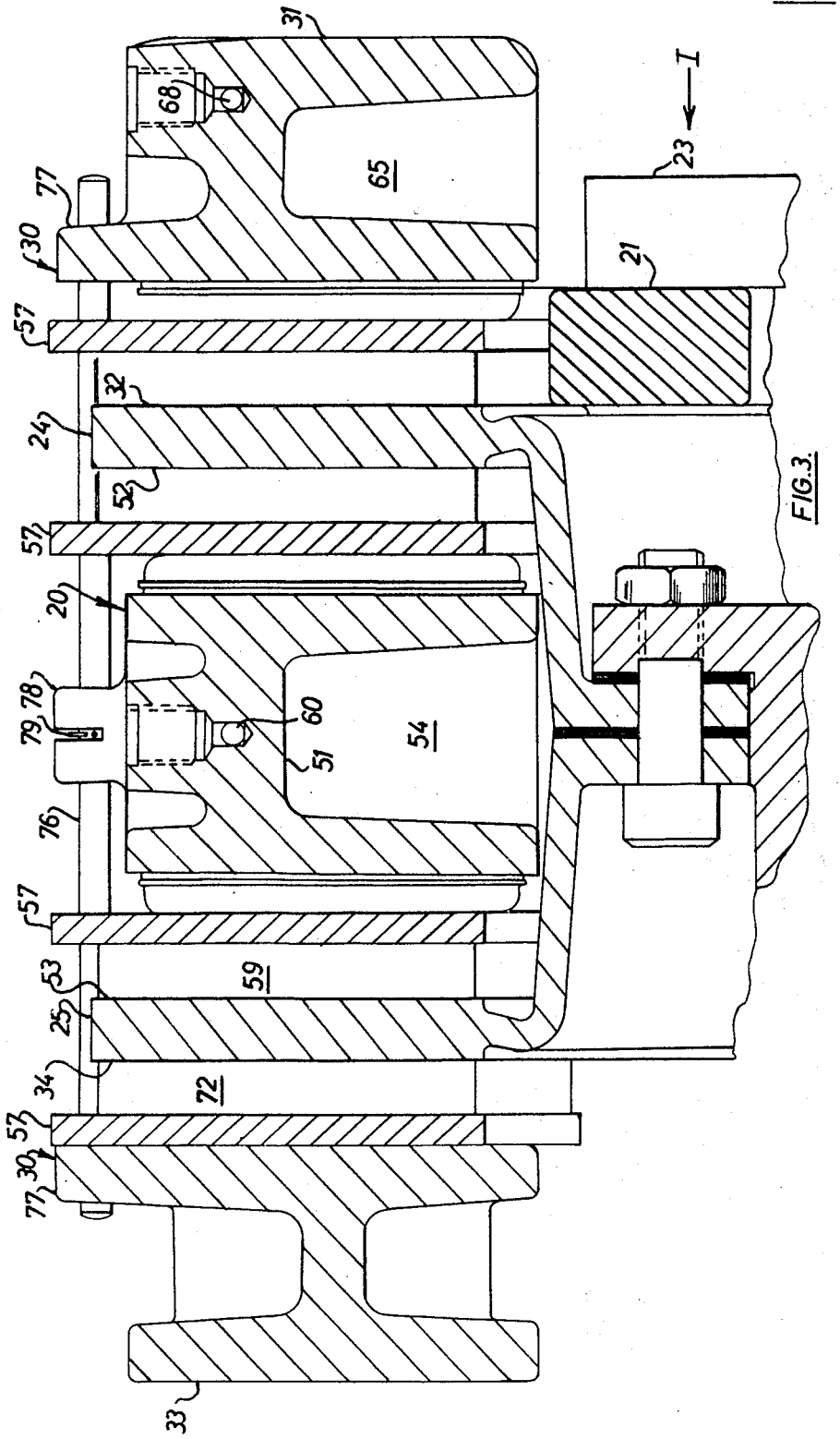
FIG. 3 is a section on the line III—III of FIGS. 1 and 2A.

Referring now to FIGS. 1, 2A and 3 of the drawings, a twin-disc brake includes a body member 20 which has a mounting flange 21 provided with four holes 22 to enable the body member to be fixed to a suitable support 23 adjacent twin brake discs 24 and 25 (shown in FIG. 3 only). The discs 24 and 25 are axially fixed relatively to one another and to the support 23. The body member 20 is thus a fixed part of the brake. The body member is preferably an integral casting as shown.

A yoke or caliper 30 is mounted on the body member 20 for axial sliding movement relative thereto. The yoke comprises a first beam 31 running across the outer face 32 of the disc 24, a second beam 33 running across the outer face 34 of the disc 25 and a pair of tie rods 36 slidably mounted in parallel bores 37 through the body member 20. Each tie rod 36 passes through both beams 31 and 33 and has a head 38 at the outside of the second beam 33 and a nut 39, locked by a lock nut 40 resting against the outer face of the first beam 31. The beams 31 and 33 are thereby held in fixed spatial relationship and move as a unitary member. Rubber boots 41 protect the bores 37 from dirt.

Figure 4:
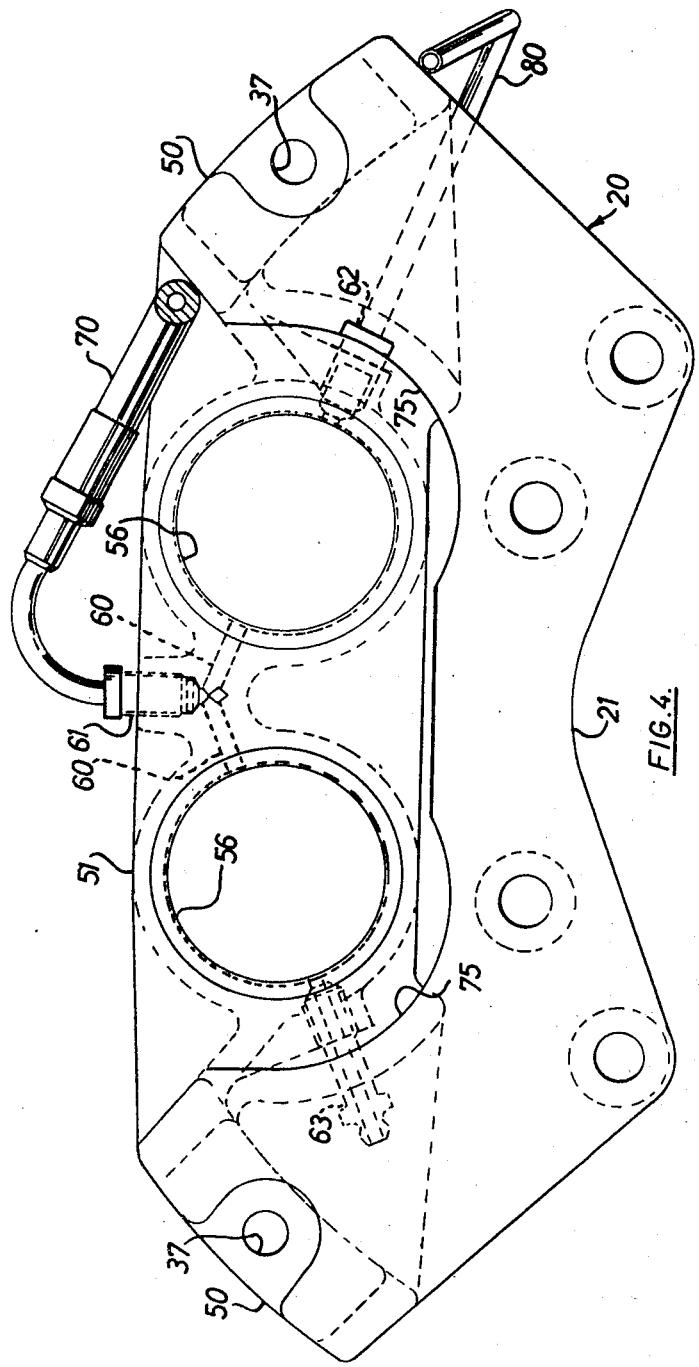
FIG. 4 is a side elevation of the body member of the brake of FIGS. 1, 2 and 3.

As may be perceived also from FIG. 4 the mounting flange 21 of the body member 20 joins two side portions 50 through which pass the bores 37. The side portions 50 are also joined by a medial web portion 51 which extends between the discs 24 and 25 across their inner faces 52 and 53 respectively.

The medial web portion 51 of the body member is itself in the form of a beam and contains a pair of hydraulic actuators 54 one of which can be clearly seen in FIG. 2A. Each actuator comprises a pair of opposed pistons 55 slidable in a corresponding bore 56 in the web portion 51, both bores 56 being shown in FIG. 4. The opposed pistons 55 act against the back plates 57 of inner brake pads 58 and 59 which cooperate with opposed inner faces 52 and 53 of the discs 24 and 25. Oil-ways 60 interconnect the bores 56 and lead to a nipple 61. An inlet nipple 62 is also connected to one of the bores 56 whilst a bleeder 63 is connected to the other bore 56.

A further pair of hydraulic actuators 65, one of which is clearly shown in FIG. 2A, is formed in the beam 31 of the yoke 30. Each actuator 65 comprises a piston 66 slidable in a bore 67 in the beam 31, both bores being shown by dotted lines in FIG. 1. Oil-ways 68 similar to the oil-ways 60 of FIG. 4 interconnect the blind ends of the bores 67 and lead to a nipple 69. One of the blind bores 67 is provided with a bleeder (not shown). All the actuator cylinders are permanently connected to one another by a flexible pipe 70 whose ends are connected to the nipples 61 and 69. Hydraulic fluid supplied to the inlet nipple 62 is thereby supplied to all the actuators simultaneously.

The pistons 66 act on the back plate 57 of a directly operated outer pad 71 whilst the beam 33 bears against the back plate 57 of the other outer pads 72. The pads 71 and 72 cooperate respectively with the outer faces 32 and 34 of the discs 24 and 25.

As can be seen in FIGS. 1 and 4, the side portions 50 of the body member 20 have portions straddling the discs with internal arcuate locating surfaces 75 thereon and the ends of the back plates 57 of the brake pads 58, 59, 71 and 72 are correspondingly shaped. The drag on the back plates during application of the brakes is thereby applied directly to the fixed body member 20. The arcuate surfaces 75 are so shaped that the brake pads can be slipped radially inwardly into position. A pair of rods 76 are then inserted in place to prevent the brake pads from swinging radially outwardly. The rods 76 are received in lugs 77 on the beams 31 and 33 and a lug 78 on the web portion 51 of the body member 20. A split pin 79 passes through the middle of each rod 76 and lies within a slit in the lug 78 to prevent the rods sliding out of place. The opening defined in the body member 20 between the locating surfaces 75 not only permits replacement of the pads without dismantling the brake but also permits visual inspection of the brake pads.

Upon application of the brake, fluid pressure is applied to the nipple 62 through a main oil line 80 and is distributed to all the actuator cylinders through the oil ways 60 and 68 and the flexible hose 70. The pistons 55 of the actuators 54 apply the inner brake pads 58 and 59. The pistons 66 of the actuators 65 apply the outer brake pad 71. The reaction from the actuators 65 is received by the beam 31 and is transmitted through the tie rods 36 and the beam 33 to the other outer pad 72 so as to apply that pad to its respective disc 25.

It will be seen that by the use of the slidable yoke 30 the one pair of actuators 65 can be used to apply both of the outer pads. This reduces the axial dimension of the brake as compared with the previously proposed twin disc brake wherein separate actuators are provided for the two outer pads. The axial dimension can be still further reduced by replacing the actuator 54 having opposed pistons by an actuator comprising a movable cylinder block which engages one of the inner pads and contains at least one piston engaged in the other inner pad. A brake with this feature is shown in FIGS. 5 to 8 to which reference will now be made.

Figure 5:
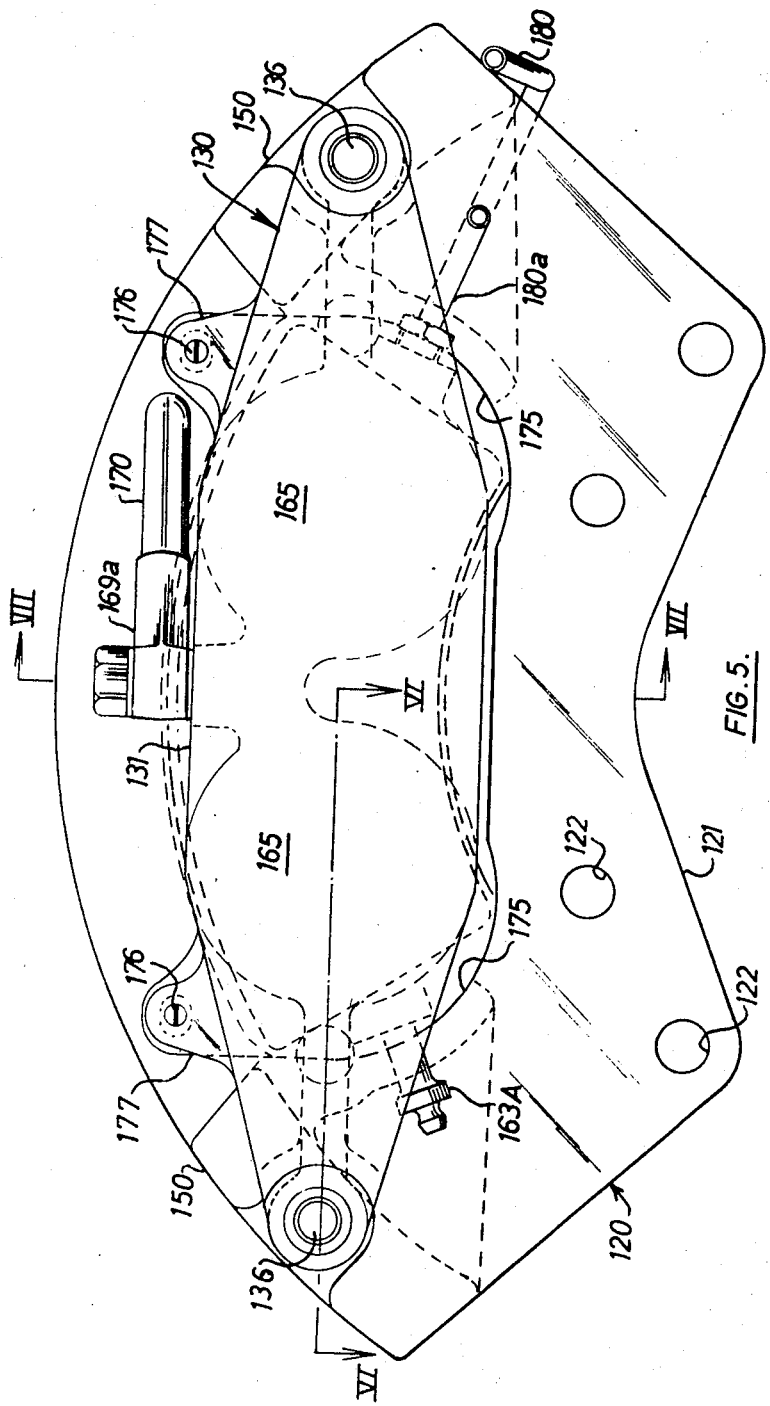
FIG. 5 is a side elevation, viewed in the direction of the arrows V of FIGS. 6 and 7, of a second embodiment of twin-disc brake constructed in accordance with the invention.
Figure 6:
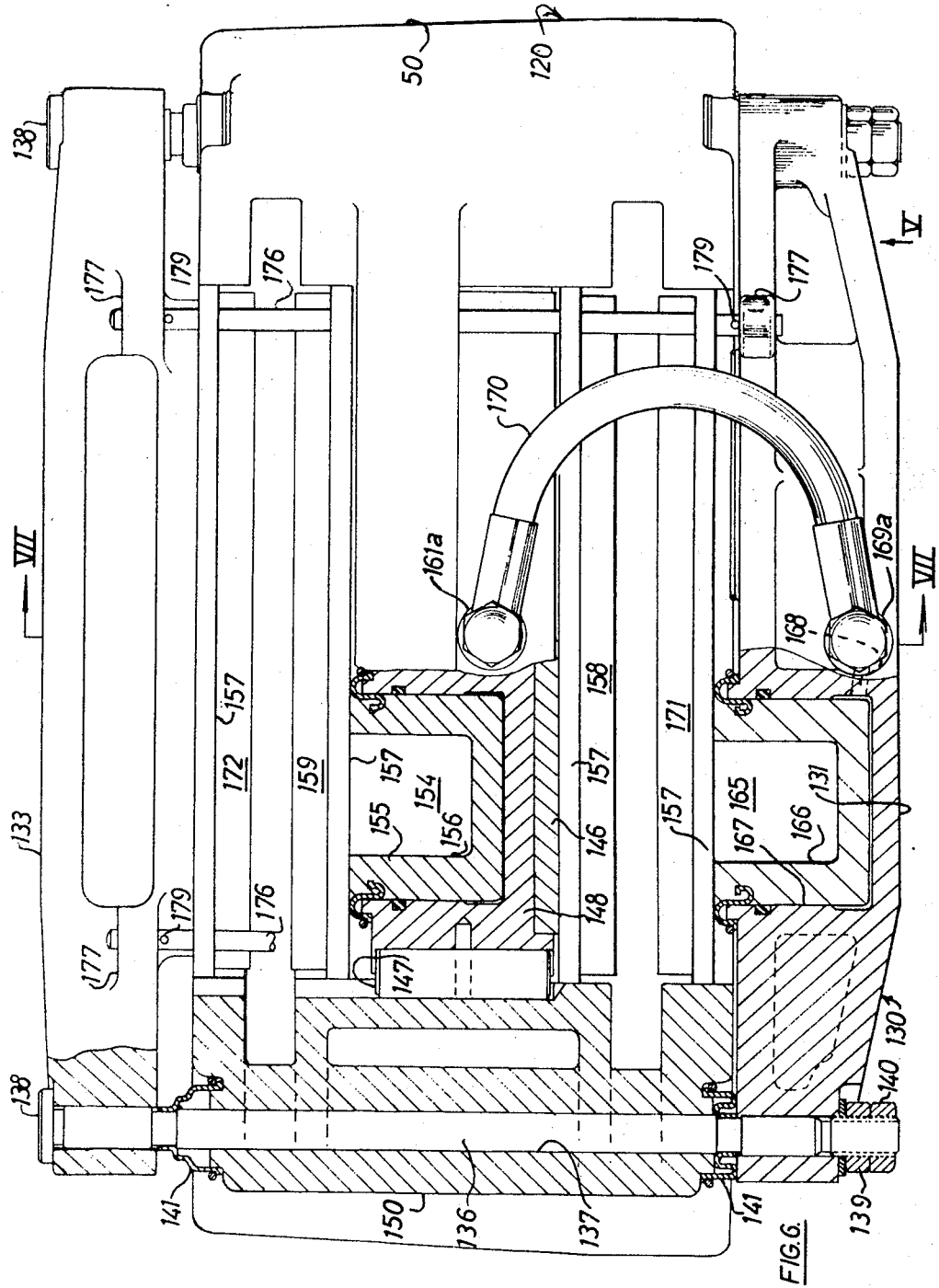
FIG. 6 is a plan view, partly sectioned on the line VI—VI of FIG. 5.
Figure 7:
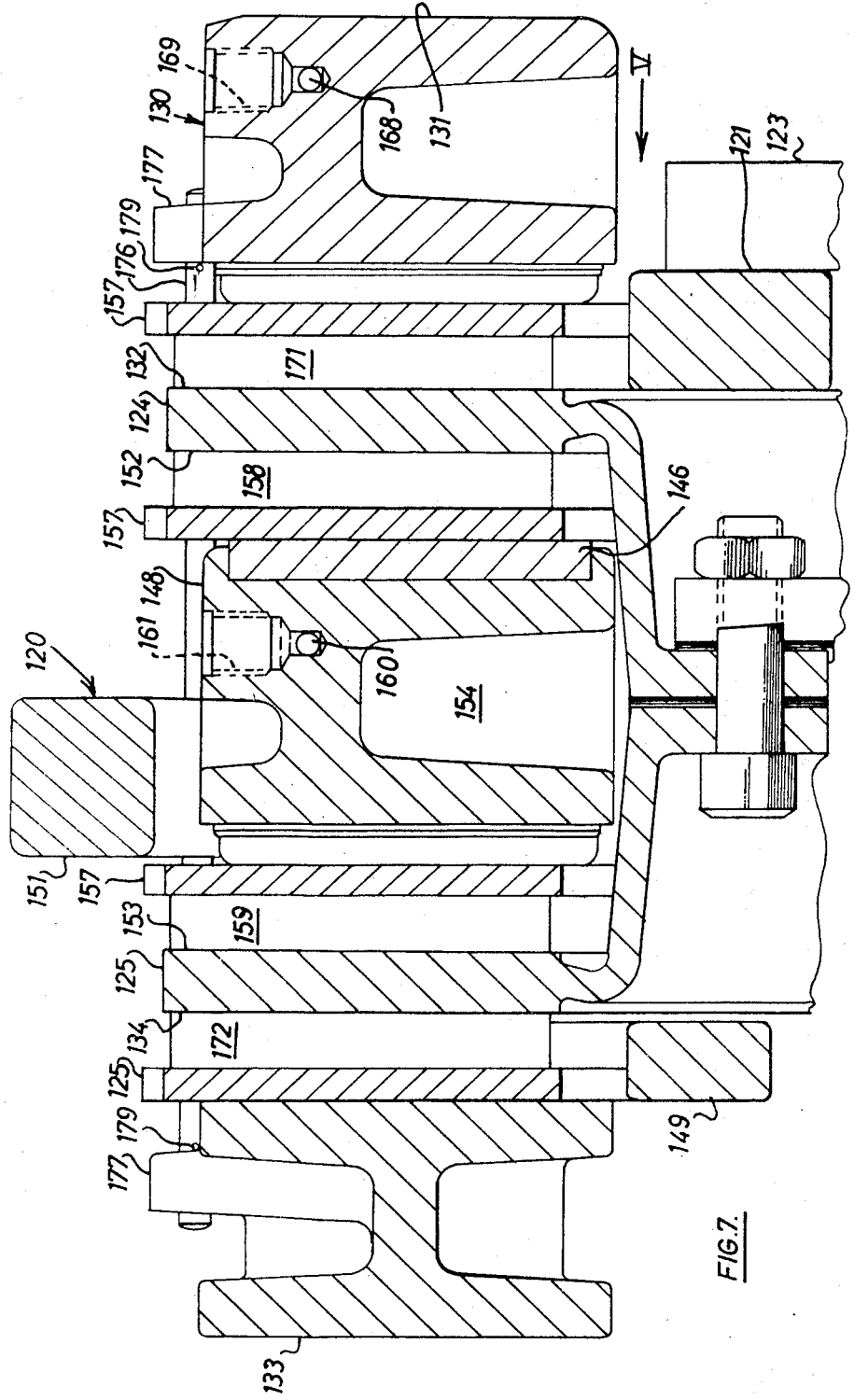
FIG. 7 is a section on the lines VII—VII of FIGS. 5 and 6.

The brake of FIGS. 5 to 8 of the drawings, has a cast body member 120 which has a mounting flange 121 provided with four holes 122 to enagle the body member to be fixed to a suitable support 123 adjacent axially fixed twin brake discs 124 and 125 (shown in FIG. 7 only). A yoke 130 is mounted on the body member 120 for axial sliding movement relative thereto. The yoke 130 is essentially the same as the yoke 30 of FIGS. 1, 2A and 3 and comprises a first beam 131, a second beam 133, and a pair of tie rods 136 slidably mounted in parallel bores 137 through the body member 120. Each tie rod 136 has a head 138 at the outside of the second beam 133 and a nut 139, locked by a lock nut 140 resting against the outer face of the first beam 131. Rubber boots 141 protect the bores 137 from dirt.

Figure 8:
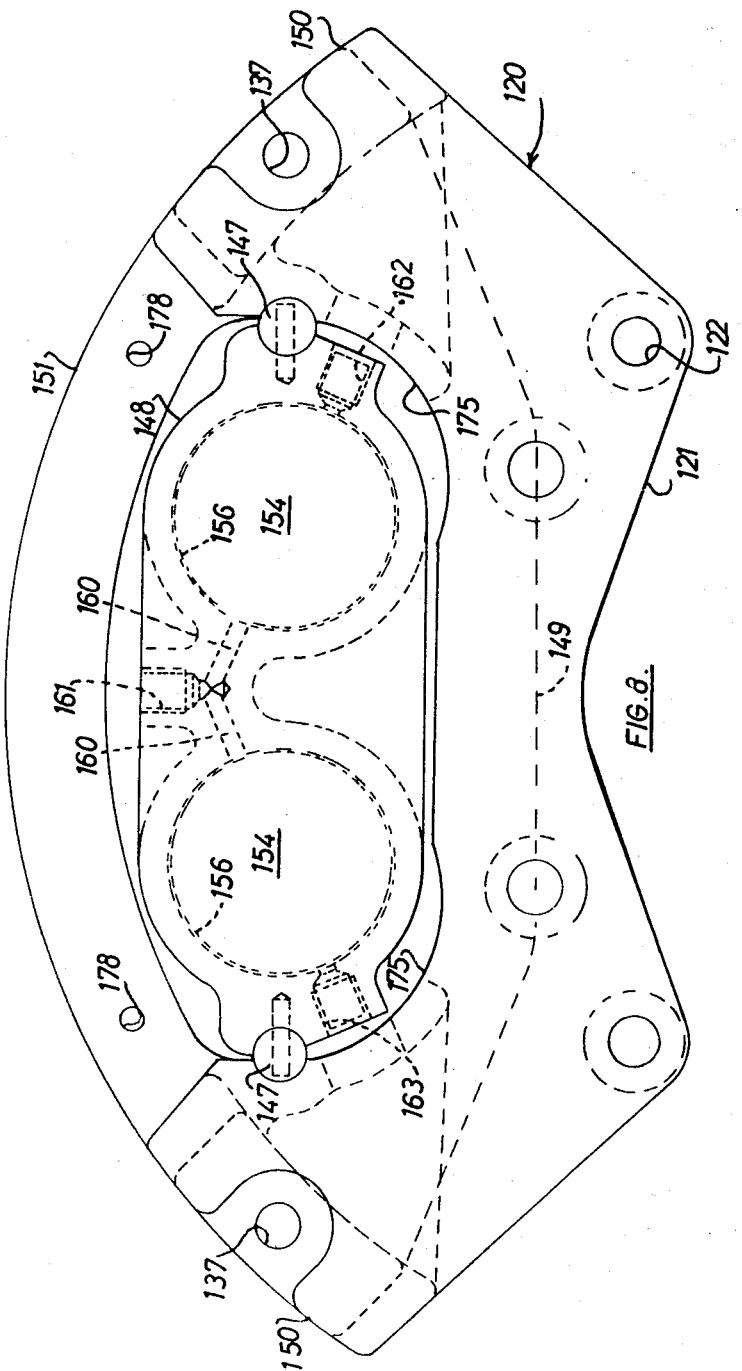
FIG. 8 is an elevation of the body member and cylinder block of the embodiment of FIGS. 5, 6 and 7.

As may be perceived also from FIGS. 7 and 8 the mounting flange 121 of the body member 120 joins two side portions 150 through which pass the bores 137. The side portions 150 are also joined by a medial web portion 151 which extends outside the peripheries of the discs 124 and 125 and a rear web portion 149 which lies radially inwards of the beam 133.

A cylinder block 148 is supported in the body member for axial sliding movement by means of a pair of cylindrical keys 147 which may be pinned to the cylinder block. The cylinder block 148 extends between the discs 124 and 125 below the web portion 151 of the body member across the inner faces 152 and 153 of the discs. The cylinder block 148 contains a pair of hydraulic actuators 154 one of which can be clearly seen in FIG. 6. Each actuator 154 comprises a piston 155 slidable in a corresponding blind bore 156 in the cylinder block 148, both bores 156 being indicated in FIG. 8. The pistons 155 act against the black plate 157 of an inner brake pad 159 which cooperates with the inner face 153 of the disc 125. Oil-ways 160 interconnect the bores 156 and lead to a socket 161. An inlet socket 162 is also connected to one of the bores 156 whilst a bleeder socket 163 is connected to the other bore 156. The cylinder block 148 acts directly on the back plate 157 of the other inner brake pad 158 cooperating with the inner face 152 of the disc 124 through a heat barrier 146.

A further pair of hydraulic actuators 165, one of which is clearly shown in FIG. 6, is formed in the beam 131 of the yoke 130. Each actuator 165 comprises a piston 166 slidable in a bore 167 in the beam 131. Oil-ways 168 similar to the oil-ways 160 of FIG. 8 interconnect the blind ends of the bores 167 and lead to a socket 169. One of the blind bores 167 has a bleeder 163a whilst the other has an alternative inlet 180a. All the actuator cylinders are permanently connected to one another by a flexible pipe 170 whose ends are connected to the sockets 161 and 169 by banjo couplings 161a and 169a. Hydraulic fluid supplied to the inlet socket 162 through an inlet line 180 is thereby supplied to all the actuators simultaneously, the alternative inlet line 180a being replaced by a plug (not shown).

The pistons 166 act on the back plate 157 of a directly operated outer pad 171 whilst the beam 133 bears against the back plate 157 of the other outer pad 172. The pads 171 and 172 cooperate respectively with the outer faces 132 and 134 of the discs 124 and 125.

As can be seen in FIGS. 5 and 8, the side portions 150 of the body member 120 have internal arcuate surfaces 175 and the ends of the back plates 157 of the brake pads 158, 159, 171 and 172 are correspondingly shaped so that the brake drag on the back plates is applied to the fixed body member 120. A pair of rods 176 prevent the brake pads from swinging radially outwardly. The rods 176 are received in lugs 177 on the beams 131 and 133 and pass through holes 178 in the web portion 151 of the body member 120. Split pins 179 pass through the ends of each rod 176 adjacent the lugs 177 to prevent the rods sliding out of place.

Upon application of the brake, fluid pressure is applied to the socket 162 through the main oil-line 180. The actuators 154 apply the inner brake pads 158 and 159. The pistons 166 of the actuator 165 apply the outer brake pad 171. The reaction from the actuators 165 is transmitted by the yoke 120 to the other outer pad 172.

Figure 9:
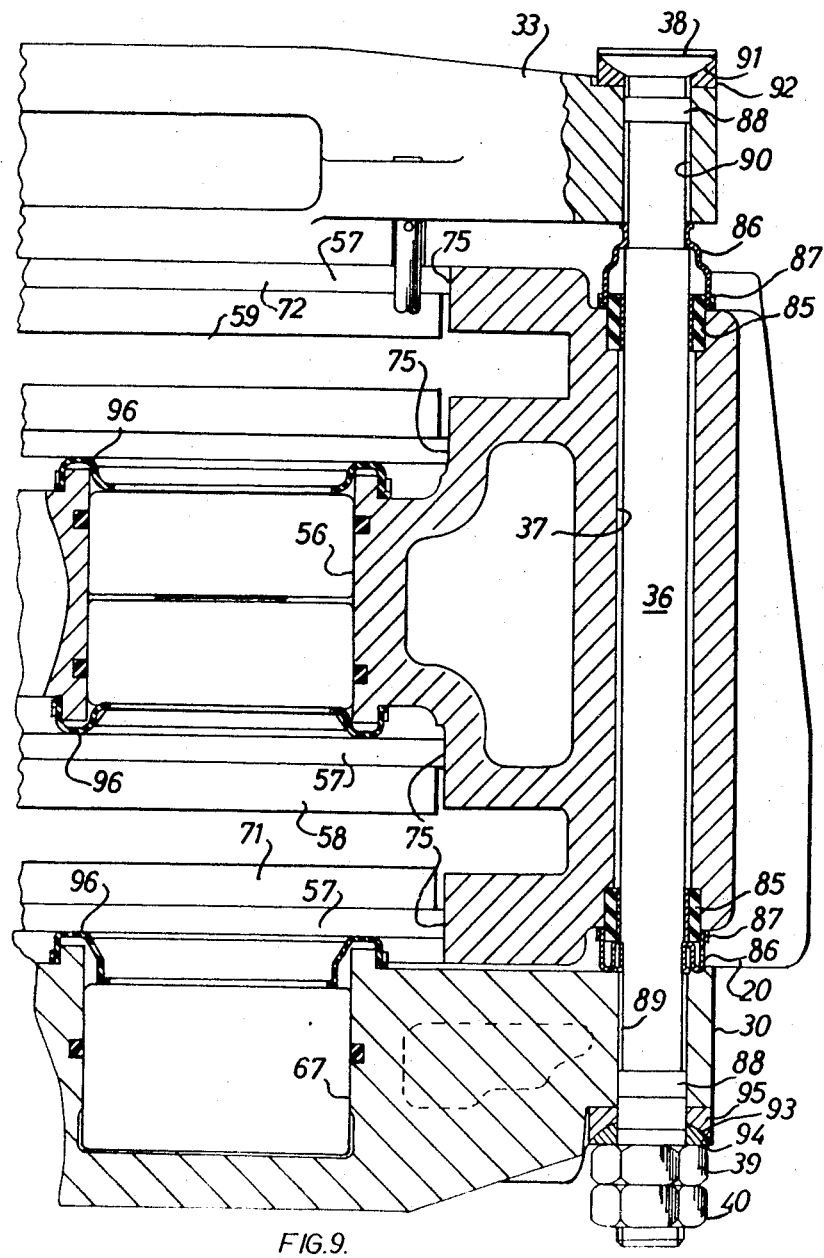
FIG. 9 is a sectional plan view of part of a modification to the brake of FIGS. 1 to 4.

FIG. 9 shows slight modifications to the brake of FIGS. 1 to 4. As shown in FIG. 9 the rods 36 of the yoke 30 have substantial clearance in the bores 37 through the body member 20. This ensures that no drag is transferred from the yoke to the body member through these rods. Metal lined resilient bushes 85 (e.g. rubber bushes) are fitted in the ends of the bores 37 to locate the rods 36 centrally in the bores 37. This ensures that any play between the back plates 57 of the pads 58, 59, 71, 72 and the arcuate abutment surfaces 75 of the body member 20, resulting in slight displacement of the yoke 30, does not cause the rods 36 to contact the walls of the bores 37. The rods 36 are thereby subjected to substantially only tensile forces and not to any appreciable bending stresses. Any tendency for the rods 36 to sprag in the bores 37 is thereby substantially avoided. Rubber boots 86 protect the bushes 85 and the bores 37 from dirt. The boots 86 are retained on protruding ends of the bushes 85 by spring rings 87.

To allow tilting of the beams 31 and 33, such as occurs if the pads wear to a wedge shape, the ends of the rods 36 have narrow collars 88 which locate the rods in the bores 89 and 90 in the beams 31 and 33. Also there is a spherical seating 91 between the head 38 of each rod 36 and a washer 92 beneath this head and a spherical seating 93 between two washers 94, 95 beneath the nut 39 on each rod 36.

The conventional boots 96 are shown, protecting the actuator bores 56 and 67 and conventional seals 97 sealing the pistons 55, 65 to these bores.

The modifications shown in FIG. 4 are also applicable to the embodiment of FIGS. 5 to 8.

Instead of the flexible linking pipe 70, 170 it may be preferable to provide separate branch conduits to the actuators in the body member 20, 120 and the actuators in the beam 31, 131. There may be a danger of brake fluid in the pipe 70, 170 being vaporized by heat from the brake discs.

In disc brakes in accordance with the invention having more than two discs, a body member, on which a yoke is slidably mounted, supports an actuator between each pair of opposed inward faces of the discs. The body member may have a separate web portion extending between each pair of opposed disc faces and containing opposed pistons, like the web portion 51 in the embodiment of FIGS. 1 to 4 or may slidably support a separate cylinder block between each pair of opposed disc faces and containing at least one piston, like the cylinder block 148 of the embodiment of FIGS. 5 to 8. The yoke preferably comprises a pair of beams connected by two tie rods which pass with clearance through bores in the body member like the tie rods 36 in the embodiment of FIG. 9.

I claim:

1. A body member for a multi-disc brake having a plurality of axially spaced apart rotatable discs, outer brake pads co-operating with the outward faces of said discs, inner brake pads co-operating with the inward opposed faces of said discs, first actuator means acting upon said inner brake pads, caliper means acting on one of said outer brake pads, second actuator means acting between the other of said outer brake pads and said caliper means, said body member including a mounting portion for disposition at one side of said discs to fix the body member in position, side portions straddling each of said discs; guide surfaces on said side portions for locating said outer and inner brake pads; means for supporting said first actuator means; and guide surfaces for axially guiding said caliper means.

2. In a multi-disc brake having a plurality of axially spaced discs and brake pads co-operable with opposite faces of each of said discs, the pads including adjoining inner brake pads co-operable with the opposed inward faces of the discs, a first outer pad co-operable with the outward face of one outer one of said discs and a second outer pad co-operable with the outward face of the other outer one of said discs: the combination comprising a fixed body member, first actuator means in said body member and acting on said adjoining inner brake pads, a yoke slidably supported on said body member and acting on said first outer pad, and second actuator means operative between said yoke and said second outer pad.

3. Multi-disc brake according to claim 2 wherein said first actuator means comprise first hydraulic cylinder and piston means and said second actuator means comprise second hydraulic cylinder and piston means and wherein said combination further comprises means hydraulically interconnecting said first and second hydraulic cylinder and piston means to render said first and second hydraulic cylinder and piston means operable simultaneously.

4. Multi-disc brake according to claim 2 wherein said body member has a radial opening permitting visual inspection of at least one of said brake pads.

5. Multi-disc brake according to claim 2 wherein said body member includes at least one medial web portion extending between said discs and wherein said first actuator means comprises at least one through bore in said medial web portion and a pair of opposed pistons slidable in said through bore and acting on said adjoining inner brake pads.

6. Multi-disc brake according to claim 2 wherein said first actuator means comprises at least one cylinder block, means slidably guiding said cylinder block in said body member for axial movement with said cylinder block extending between said discs, at least one blind bore in said cylinder block and a piston slidable in said blind bore, said cylinder block and said piston acting on said adjoining inner brake pads.

7. Multi-disc brake according to claim 6 wherein said guiding means comprises a pair of cylindrical keys.

8. Multi-disc brake according to claim 2 wherein said body member comprises side portions, and locating surfaces on said side portions for locating and receiving the brake drag from said first and second outer pads and said inner pads.

9. Multi-disc brake according to claim 8 wherein said body member has a radial opening defined therein between said pad locating surfaces and dimensioned to permit removal and replacement of said brake pads without dismantling the brake.

10. Multi-disc brake according to claim 8 wherein said side portions of said body member have axial bores therethrough and wherein said yoke comprises two beams extending across said outward disc faces and tie rods joining said beams and passing through said axial bores.

11. Multi-disc brake according to claim 10 wherein said tie rods have clearance relative to said axial bores in said body member side portions and which further comprises resilient bushes locating said tie rods in said axial bores.

12. Multi-disc brake according to claim 11 which further comprises spherical seating means between said tie rods and said beams.

13. Multi-disc brake according to claim 11 which further comprises flexible boots on said tie rods to protect said bores in said body member portions from the ingress of dirt.

References Cited

UNITED STATES PATENTS

| 2,174,408 | 9/1939 | Farmer. | |
| 2,784,811 | 3/1957 | Butler | 188—73 |
| 3,245,500 | 4/1966 | Hambling et al. | 188—73 |

FOREIGN PATENTS

| 1,301,859 | 7/1962 | France. |
| 1,035,279 | 7/1966 | Great Britain. |

GEORGE A. HALVOSA, *Primary Examiner.*